Nov. 20, 1962 H. SCHIEBER ET AL 3,064,703
TRACTION-CHAIN MOUNTING
Filed Oct. 16, 1961
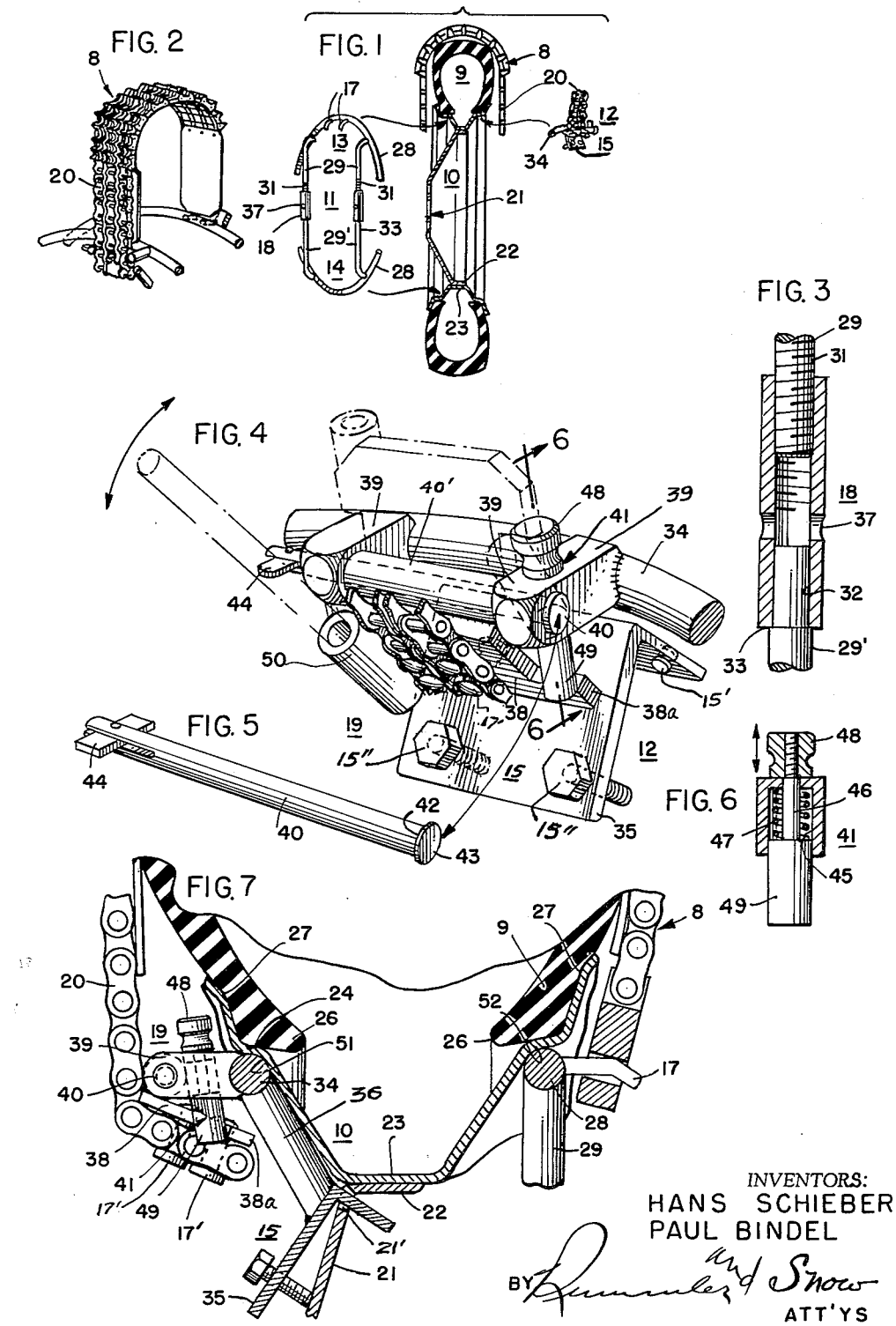
INVENTORS:
HANS SCHIEBER
PAUL BINDEL
ATT'YS

United States Patent Office 3,064,703
Patented Nov. 20, 1962

3,064,703
TRACTION-CHAIN MOUNTING
Hans Schieber, 2270 W. Logan Blvd., and Paul Bindel, 3946 W. North Ave., both of Chicago, Ill.
Filed Oct. 16, 1961, Ser. No. 145,223
8 Claims. (Cl. 152—233)

This invention relates to mountings for the temporary securing of traction chains over motor-vehicle tire treads.

The main objects of this invention are to provide an improved form of mounting for clamping traction chains over the treads of motor-vehicle tires; to provide traction-chain mountings of this kind having improved means for clamping the mounting on the tire rim and tautening the chains over the tire tread; to provide an improved traction-chain mounting of this kind structured of separate parts for facile assembling and positioning on the tire rim and securing the traction chains in place and for a facile disassembling and compact packing for storage and/or transit; and to provide an improved traction-chain mounting of this kind of such simple construction as to make its manufacture very economical and its use extremely facile.

In the adaptation shown in the accompanying drawings;

FIGURE 1 is a partially exploded view showing a set of embracing traction chains on a motor vehicle tire and in opposite spaced-perspective the two elements constructed in accordance with this invention whereby the chains are secured in place over the tire tread;

FIG. 2 is a perspective view of a tire chain set especially adapted for use with the mounting elements shown in FIG. 1;

FIG. 3 is an enlarged, cross-sectional, detail of the expansible connection of the element parts which effect their expansion into use position on the periphery of the tire rim;

FIG. 4 is an enlarged perspective view of the latch means whereby the chain set is tautened over and held in operative position on the tire tread;

FIG. 5 is a perspective view of the toggle-locking hinge pin which swingably secures the latch means on one of the element parts;

FIG. 6 is a cross-sectional detail of the detent which holds the latch means in its chain-securing position; and FIG. 7 is a further-enlarged, fragmentary, detail showing in cross-section the rim and tire with the chain set secured in operative position by a mounting constructed in accordance with this invention.

The essential concept of this invention involves a set of two elements one comprising two relatively-adjustable parts for expanded pressured seating onto the opposite inner peripheries of a tire rim, one of which parts has one or more prongs for anchoring one end of a chain set to the mounting, the other element having the opposite end of the tire chain set secured thereto and incorporating a latch means shiftable into and out of position for locking the chain set over a tire tread.

A traction-chain mounting, for use in securing a chain set 8 over the tread of a conventional tire 9 on a supporting rim 10, embodying the foregoing concept comprises a pair of elements 11 and 12, the element 11 being structured of two parts 13 and 14 having prongs 17 for attaching one end of the chain set 8. The element 12 comprises one part 15 having the other end of the chain set 8 bonded thereto such as by rivets 17' (Fig. 7). The parts 13—14 are secured together by a connector 18 the opposite turning of which connector expands the elements 11 into or retracts it from clamped position on the diametrically opposite inner periphery of the rim 10, with the chain set 8 tautened over the tire tread by the latch means 19.

The chain set 8, preferably, is of the form disclosed in Patent No. 2,955,634, issued October 11, 1960, the end portions of which have a section of links 20 common to sprocket chain belts.

The tire 9 and rim 10 here are shown as a conventional tubeless assembly. The rim 10 is an annulus of V-shaped cross-section spanned by a frusto-conical-shaped hub plate 21 with a peripheral flange 22 bonded to the base 23 of the V-shaped rim 10. The rim 10 has its opposite perimetrical portions flared outwardly to form seats 24 for the beads 26 of the tire 9 and provide tire-confining and embracing flanges 27.

The element 11 is structured for clamping on the inside periphery of the rim 10. Because the element 11, for use on the inside face of the rim 10, has to straddle the axle bearing for the respective wheel the parts 13 and 14 of the element 11 have to be structured differently from the part 15.

The parts 13 and 14, of the element 11, each comprise an arcuate-shaped bar 28 and a pair of radially-spaced parallel support members in the form of posts 29 and 29'. The bars 28 span an angle of less than 180 degrees. The outer ends of the posts 29—29' are bent and bonded to the respective bars 28 to dispose the main portions of the posts 29—29' outwardly from the common plane of the two bars 28 when attached to connectors 18. The inner ends of the posts 29 have threads 31 for screwing into the threaded ends of the connectors 18. The posts 29' have reduced ends 32 to slidingly fit in the other ends of the connectors 18 to the limit of the shoulders 33 (see FIG. 3).

The part 15 of the element 12 comprises an arcuate-shaped bar 34 and an angle plate 35 bonded to the end of post 36 which post 36 is welded to the bar 34 medially of its ends. The bar 34 here is shown of a length much less than the bars 28 of the element 11. The bars 28, 34 are shown to be of circular cross-section. However, they could be of rectangular cross-section, if desired.

The prongs 17 for the element 11 are secured in pairs to the bars 28 between the posts 29—29'. For the element 12, the plate is secured to the rim by inserting the smaller leg through the usual slot 21' in the rim. The smaller leg of the plate 15 is provided with a small headed rod 15' to prevent the plate from accidental dislodgement. The plate is also provided with a pair of machine screws 15" seated in threaded apertures in the longer leg of the plate 15, which when turned up wedges the plate against the rim to anchor the arcuate bar 34 to the rim ledge 52.

The connectors 18, in effect are elongated hexagonal nuts with threads extending inwardly from one end for half the length thereof and being plain the other half to slidingly receive the stems 32 on the posts 29' up to the limit of the shoulders 33. Medially located in the connectors 18 are transverse holes 37 (FIG. 3) which provide for the insertion of a small tool (not shown) to turn the connectors 18 to expand or contract the elements 11 and 12, respectively, to secure them on or remove them from the rims 10, as will be indicated in the subsequent explanation of the use of this improved traction-chain mounting.

The latch means 19, on the element 12, comprises the plate 38, mounting one end of chain 20, and journaled on lugs 39 by a hinge pin 40 for swinging the plate 38 below the lugs 39 and towards the plate 15. A detent 41 is positioned to retain the latch plate 38 in its fully-retracted position to lock the chain set 8 embracively over the tread of the tire 9.

The pin 40 is formed wtih a head 42 and a toggle 44 to prevent the accidental withdrawal of the hinge pin 40 from the elongated sleeve 40' which is welded to the upper surface of plate 38. A shoulder 38a is also formed on plate 38 for engagement with the detent 41 to retain the plate 38 in its fully-retracted position. The hinge pin 40 extends transversely through the outer ends of the pair of lugs 39 integrated with the bar 34. By the insertion or withdrawal of the hinge pin 40 the plate 38 is readily attached to or removed from the lugs 39.

The detent 41 is slidably arranged in a recess 45 in a lug 39 with a reduced shank 46 embraced by a spring 47 (FIG. 6). A retaining knob 48 threaded onto the upper end of the detent shank 46 permits manual retraction of the free end 49 of the detent 41 from retaining engagement with the plate 38.

A socket 50 is integrated with the latch plate 38 for the insertion of a tool, such as a length of a rod, for applying power to swing the latch plate 38 to tauten the chain set 8 over the tread of a tire 9 and finally latch the plate 38 in such chain-set tautening position.

A pair of elements 11 and the plate 15 and a chain set 8 are put in position on a rim and tire in the following manner:

Since the posts 29' are freely slidable in the connectors 18, the latter generally will be threaded on the ends of the posts 29 of the elements 11. With these connectors 18 screwed back on these posts 29, the separated parts 13 and 14 are first set over the wheel bearing on the inside of the rim 10. The reduced ends 32 of the posts 29' then are inserted into the connectors 18. The bars 28 are set against the inside face of the rim 9 and the connectors 18 are turned to expand the relationship of the parts 13 and 14 to firmly seat the bars 28 in the peripheral ledge 52.

The angle plate 15 is next positioned on the ledge 51 of rim 10 by inserting the small leg through the slot 21' and tightening up the screws 15". After such positioning of the element 12 on the rim 10 the latch plate 38 is swung upwardly into its fully-retracted position the opposite to that shown in FIG. 4. The free end of the chain-set 8 then is placed over the tire 9 (FIG. 1) and the end links 20 (or a block as shown in the aforesaid patent) are placed over the pair of prongs 17 on bar 28.

With a suitable rod inserted into the socket 50 the latch plate 38 is swung downwardly into the position shown in FIGS. 4 and 7. As this downwardly-swinging plate 38 approaches the detent 41 the shoulder 38a cams the detent 41 against the action of the spring 47. The completed swinging of the plate 38 permits the detent 41 to resume its normal position to engage the shoulder 38a and thereby lock the chain-set 8 embracively over the tread of the tire 9.

Obviously, one or two chain-sets 8 may be locked embracively over the tire 9, with one set of elements 11 and 12, as circumstances may require.

To remove a chain-set 8 from a tire 9, a rod may be inserted into the socket 50 and, after lifting the detent 41, the latch plate 38 may be swung up into a position that will permit the detachment of the ends of the chain-set 8 from the prongs 17. Upon reversing the previous turning of the connectors 18 they will move back on the posts 29 whereupon the parts 13 and 14 of the element 11 may be separated and removed from the rim 10. However, once the element 11 is put in place it may remain there and not removed, hence simplifying the attachment of the chain-set when desired.

The fact that the posts 29' are free to slip out of the connectors 18, when the element 11 is removed from a the rim 10, the respective parts 13 and 14 are separable to permit a very compact arranging of these parts for storage or transport.

Although but one specific embodiment of this invention is herein shown and described, it will be understood that details of the construction shown may be altered or omitted without departing from the spirit of the invention as defined by the following claims.

We claim:
1. A motor-vehicle traction-chain mounting comprising, a pair of bars of predetermined arcuate form, a support member integrated with each bar and extending inwardly of the concave periphery of the respective bars, a connector telescopically seating the free ends of the support members for disposition of the bars in a circumferential relationship approximating that of and seating in the exposed inner peripheral ledge on a conventional motor-vehicle tire rim, coacting means on the free ends of the support members and the connector whereby the opposite turning of the connector effects an expansion or contraction of the circumferential relationship of the two bars to retain the bars in and release the bars from the rim ledge, means on one of the bars for the attachment of one end of a chain set extending over the tread of a tire on the rim, and cooperative means removably fixed to the outer rim ledge for the reception and anchoring the other end of the chain set.

2. A motor-vehicle traction-chain mounting comprising, a pair of bars of predetermined arcuate form, a pair of parallel support members integrated with each bar extending inwardly of the concave periphery of the respective bars in a plane offset from the planes of the respective bars, a pair of connectors telescopically seating the free ends of the support members for disposition of the bars in a circumferential relationship approximating that of and seating in the exposed inner peripheral ledge on a conventional motor-vehicle tire rim, coacting means on the free ends of the support members and the connectors whereby the opposite turning of the connectors effects an expansion or contraction of the circumferential relationship of the two bars to retain the bars in and release the bars from the rim ledge, means on one of the bars for the attachment of one end of a chain set extending over the tread of a tire on the rim, and cooperative means removably fixed to the outer rim ledge for the reception and anchoring the other end of the chain set.

3. A motor-vehicle traction-chain mounting comprising, a pair of bars of predetermined arcuate form, a support member integrated with each bar extending inwardly of the concave periphery of the respective bars in a plane offset from the planes of the respective bars, one of the support members having the free end threaded, the other support member having the free end of reduced diameter outwardly of a peripheral shoulder, a connector having one end threaded internally for receiving the threaded end of the one member and having the other end internally dimensioned to receive the reduced end of the other member, whereby the opposite turning of the connector effects an expansion or contraction of the circumferential relationship of the two bars for retentively seating the bars in and releasing the bars from the inner rim ledge, means on one of the bars for the attachment of one end of a chain set extending over the tread of a tire on the rim, and cooperative means removably fixed to the outer rim ledge for the reception and anchoring the other end of the chain set.

4. A pair of motor-vehicle traction-chain mounting elements, adapted for seating in exposed inner and outer peripheral ledges on tire rims, one of the elements comprising, a pair of bars of predetermined arcuate form, a support member integrated with each bar extending inwardly of the concave periphery of the respective bars in a plane offset from the planes of the respective bars, a connector telescopically seating the free ends of respective support members, means on the free ends of the support members and the connectors whereby the opposite turning of the connectors effects an opposite relative shifting of the bars, the element being expansible by the turning of the respective connectors to seat the bars of the element in the peripheral ledge on the inner face of a tire rim, means on one of the bars for the attachment of one end of a chain set extending over the tread of a tire on the rim, and the other of said elements being removably secured to the outer face ledge of tire rim with the other end of the chain set being anchored to said second element.

5. The device according to claim 4 wherein a latch means is provided on said second element for tautening the chain set over the tire tread.

6. A pair of motor-vehicle traction-chain mounting elements, one of said elements adapted for expanded seating in inner peripheral ledge on a tire rim, said one element comprising, a pair of bars of predetermined arcuate form, a support member integrated with each bar extending inwardly of the concave periphery of the respective bars in a plane offset from the planes of the respective bars, a connector telescopically seating the free ends of respective support members, means on the free ends of the support members and the connectors whereby the opposite turning of the connectors effects an opposite relative shifting of the bars, the elements being expansible by the turning of the respective connectors to retentively seat the bars in the exposed peripheral ledge on the inner face of a tire rim and diametrically opposite each other, prongs on one of said bars for the attachment of one end of a chain set extending over the tread of a tire on the rim, the second element comprising an arcuate bar, a pair of spaced lugs extending outwardly from said bar, an angle plate secured to said bar and depending therefrom, said angle plate removably secured to the tire rim, and a latch member having the other end of the chain set secured thereto, said latch member being pivotally secured to and between said lugs, the latch member being swingable in a plane downwardly and inwardly toward the tire rim to lock the chain set embracively tautened over the tire tread.

7. The device of claim 6 wherein a retractable detent is shiftably mounted in one of said lugs to retain said latch member in locked position.

8. The device according to claim 6 wherein a socket member is mounted on said latch member for seating a tool for swinging said latch member between opposite positions, and a retractable detent is shiftably mounted in one of said lugs to retain said latch member in locked position.

References Cited in the file of this patent
UNITED STATES PATENTS

| | | |
|---|---|---|
| 2,474,521 | Fogarty | June 28, 1949 |
| 2,711,770 | Conoscente et al. | June 28, 1955 |
| 2,870,814 | Khachikian | Jan. 27, 1959 |
| 2,955,634 | Schieber et al. | Oct. 11, 1960 |